Figure 1:
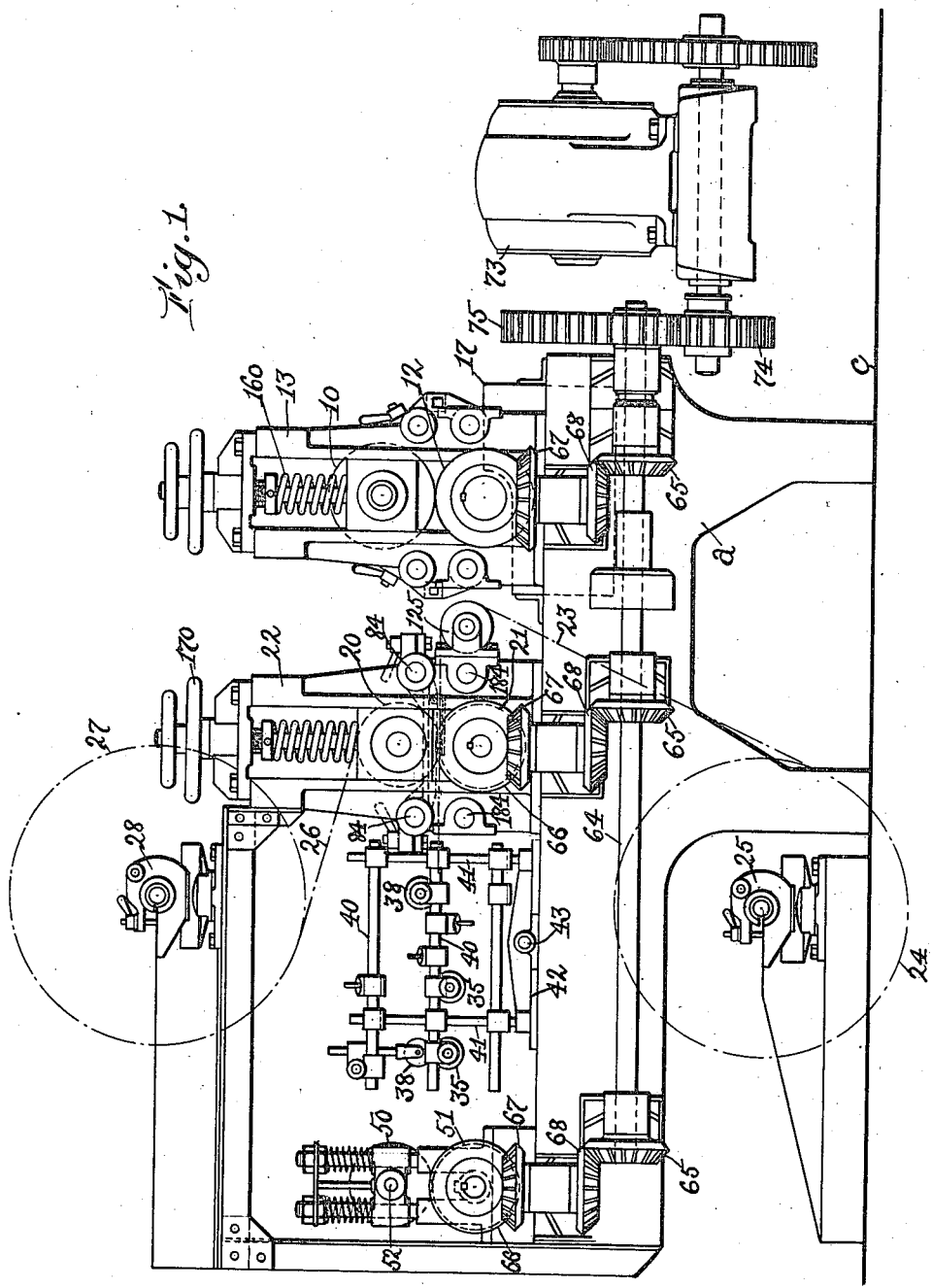

Aug. 21, 1923.

W. W. RONEY 1,465,563

APPARATUS FOR THE MANUFACTURE OF PROTECTED METAL SHEETS

Filed June 25, 1920

5 Sheets-Sheet 1

Inventor:
William W. Roney
By Jas. H. Churchill
Atty.

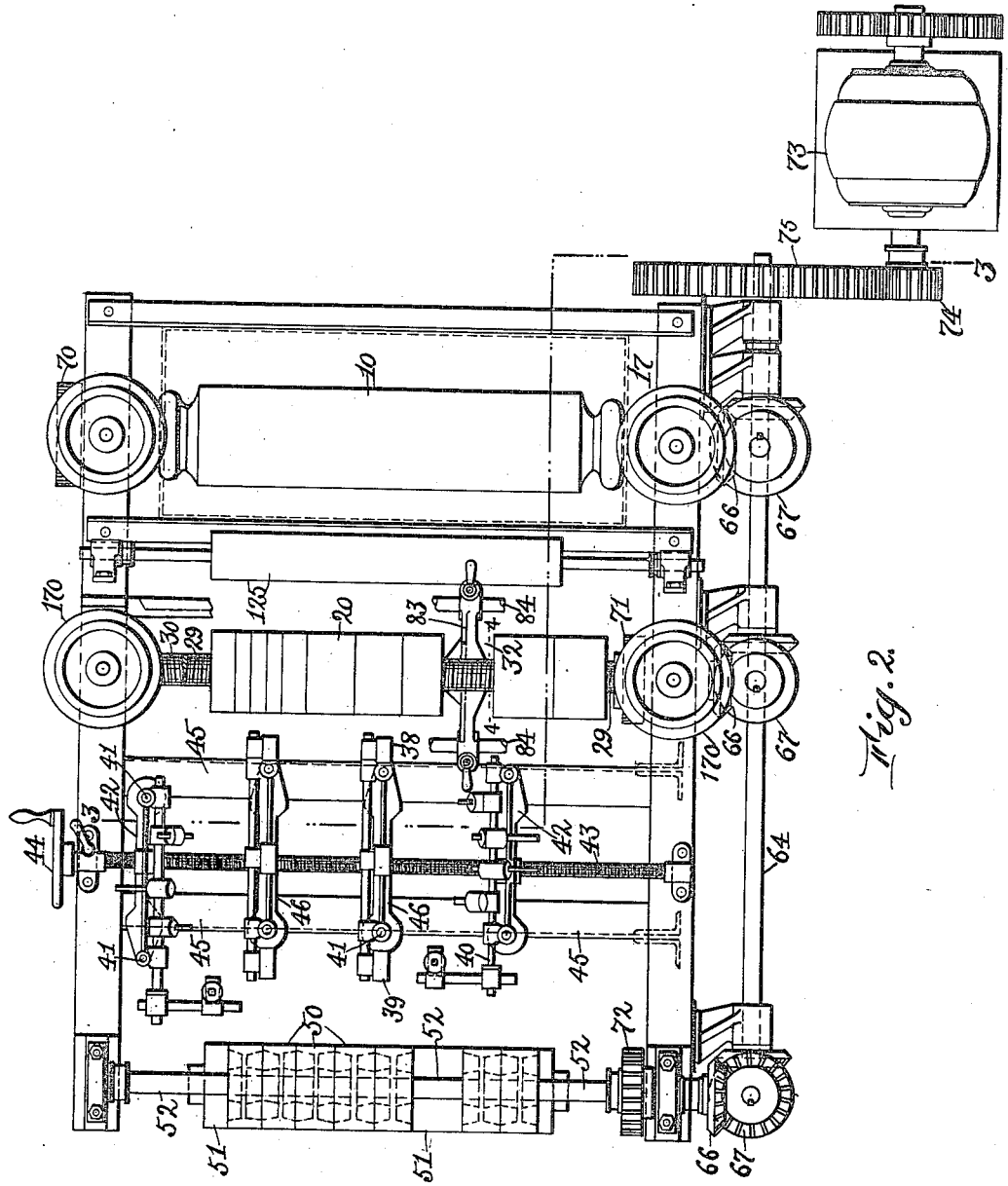

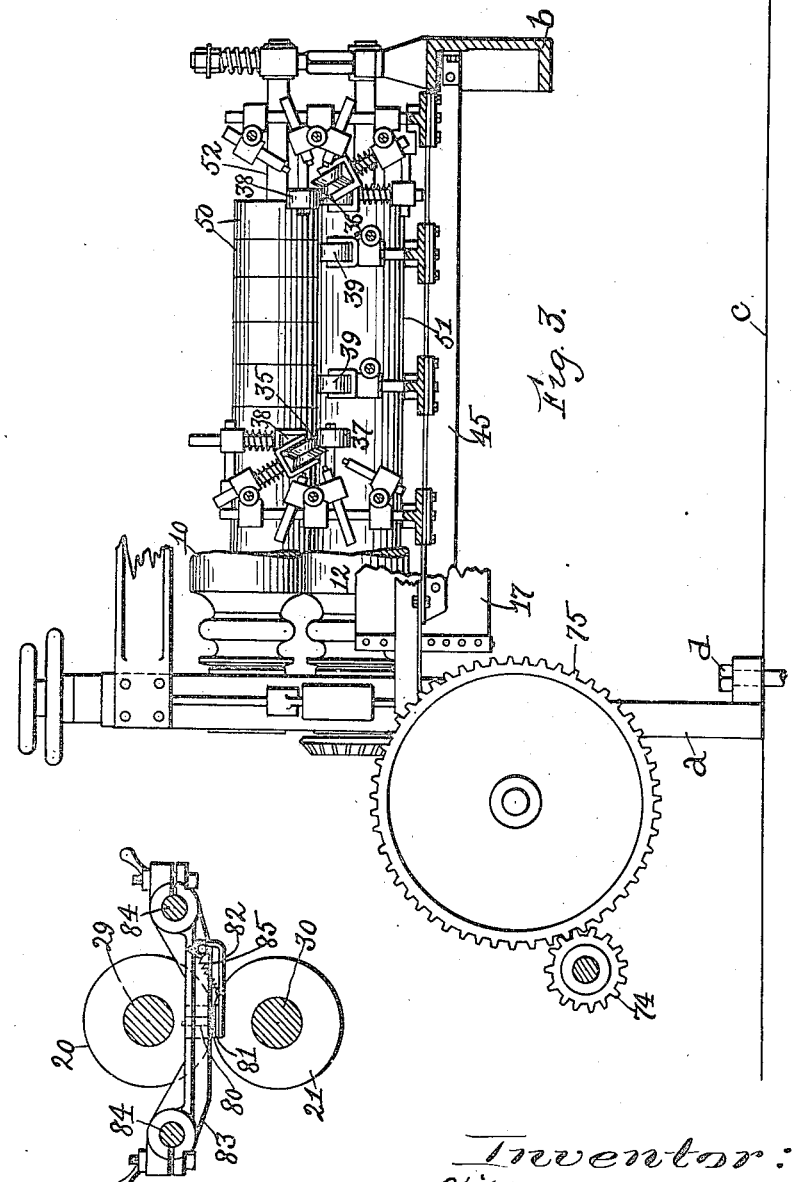

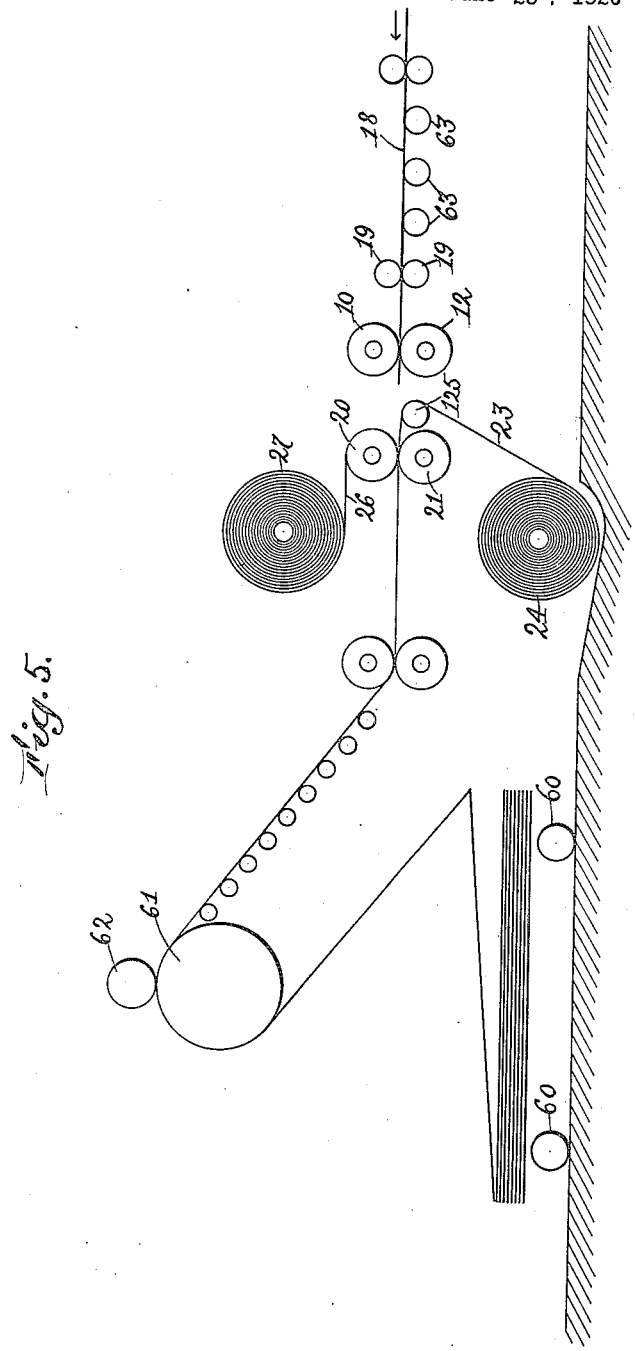

Aug. 21, 1923.
W. W. RONEY
1,465,563
APPARATUS FOR THE MANUFACTURE OF PROTECTED METAL SHEETS
Filed June 25, 1920    5 Sheets-Sheet 5
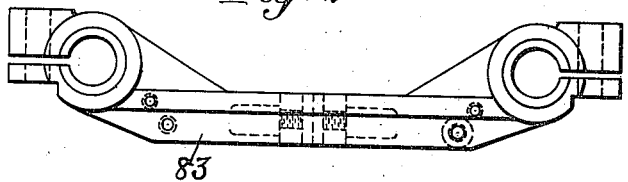
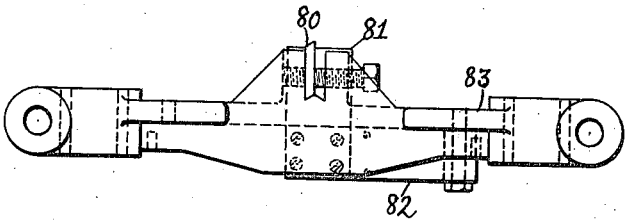
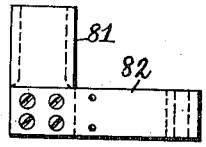
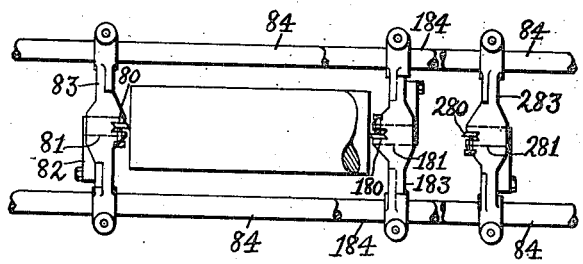
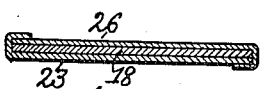
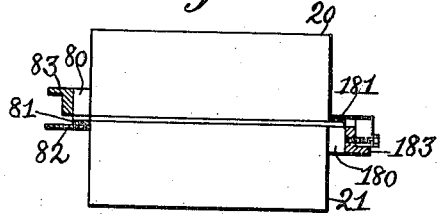
Inventor:
William W. Roney
by Jas. H. Churchill atty.

Patented Aug. 21, 1923.

1,465,563

UNITED STATES PATENT OFFICE.

WILLIAM W. RONEY, OF SEWICKLEY, PENNSYLVANIA, ASSIGNOR TO H. H. ROBERTSON COMPANY, OF PITTSBURGH, PENNSYLVANIA, A CORPORATION OF PENNSYLVANIA.

APPARATUS FOR THE MANUFACTURE OF PROTECTED METAL SHEETS.

Application filed June 25, 1920. Serial No. 391,799.

*To all whom it may concern:*

Be it known that I, WILLIAM W. RONEY, a citizen of the United States, residing in Sewickley, in the county of Allegheny and State of Pennsylvania, have invented an Improvement in Apparatus for the Manufacture of Protected Metal Sheets, of which the following description, in connection with the accompanying drawings, is a specification, like characters on the drawings representing like parts.

This invention relates to apparatus for the manufacture of protected metal or other sheets in which protecting layers of fibrous material, such as asbestos paper, felt or the like, are adhesively affixed to the metal sheets, and is an improvement upon the apparatus shown and described in U. S. Patent No. 1,277,758, granted to me September 3, 1918, with which separate fibrous layers are adhesively affixed to the opposite surfaces of the metal sheet and envelop the side edges of the latter. The present invention has for one of its objects to simplify and improve apparatus of the character described, whereby the metal or other sheet may be moved in substantially the same plane while it is being coated with the asphalt or other adhesive and while the fibrous layers are applied to the coated metal sheet and folded over the side edges of the latter.

The invention further has for its object to provide apparatus with which protected metal or other sheets of different widths may be produced.

These and other features of the invention will be pointed out in the claims at the end of this specification.

Fig. 1 is a side elevation of an apparatus embodying the invention.

Fig. 2, a plan of the apparatus shown in Fig. 1.

Fig. 3, a section of the apparatus shown in Fig. 1, on the irregular line 3—3.

Fig. 4, a section on the line 4—4, Fig. 2, to show the scraper for the upper roll.

Fig. 5, a diagrammatic view to illustrate the working of the apparatus shown in Fig. 1.

Fig. 6, an elevation of the scraper bracket shown in Fig. 4.

Fig. 7, a plan of the bracket shown in Fig. 6 with the scraper and flap supporter affixed thereto.

Fig. 8, a plan of the flap supporter shown in Fig. 7.

Fig. 9, a detail in plan showing the combining rolls and the scraper brackets cooperating therewith.

Fig. 10, an elevation to illustrate the action of the scrapers and flap supports, and Fig. 11, a section of the protected metal sheet produced with the apparatus herein shown.

Referring to the drawings, $a$, $b$ represent the side uprights of the framework of the apparatus, which are suitably secured to a supporting base $c$ by bolts $d$ or otherwise and are suitably connected together.

The framework supports the essential elements of the apparatus, which comprise means for coating the metal or other sheet with adhesive material, preferably asphalt or other fluid hydrocarbonaceous material; means for applying the fibrous layers to the opposite surfaces of the coated metal sheet, means for folding the fibrous layers over the side edges of the metal sheet, and means for delivering the protected metal sheet from the apparatus. These elements are arranged so that the metal sheet may be maintained in substantially the same plane as it passes through the apparatus.

To this end, the means for coating the metal sheet consists of a pair of rolls 10, 12, vertically arranged in uprights 13, erected upon the side frames $a$, $b$, said rolls having cooperating with them means to supply them with liquid asphalt or other coating material, said supply means consisting of a trough or pan 17 which cooperates with the lower roll 12 and in which the latter roll runs. The upper roll 10 receives liquid asphalt from the lower roll as will be described and applies it to the upper surface of the metal sheet represented in Fig. 5 by the line 18, and the lower roll 12 applies the asphalt to the lower surface of the metal sheet. If desired or required additional liquid asphalt may be supplied to the upper roll 10 by a pipe not shown.

The uncoated metal sheet 18 may be fed to the coating rolls 10, 12 by suitable feed rolls 19. From the coating rolls 10, 12, the coated metal sheet 18 passes through a pair of combining rolls 20, 21 vertically arranged in uprights 22 supported by the side frames $a$, $b$. The lower combining roll 21 receives a layer 23 of asbestos paper or other fibrous material from a large roll 24 of the same, which latter is mounted to turn in suitable supports 25 located below the combining roll 21 and at the rear thereof, said layer preferably passing over an idler roll 125 supported by the uprights 22 and located between the coating rolls 10, 12 and the combining rolls 20, 21 and serving as a supporting roll for the coated metal sheet 18 on the passage of the latter from the coating rolls to the combining rolls.

The upper combining roll 20 receives a layer 26 of asbestos paper or other fibrous material from a large roll 27 located above and at the rear of the combining roll 20 and mounted to turn in suitable supports 28 carried by the side uprights $a$, $b$ of the frame of the apparatus. The combining rolls 20, 21 are preferably made in sections which may and preferably will be of different sizes or widths as illustrated in Fig. 2, and the sections of each roll are screw threaded on their inner circumference to engage screw threaded shafts 29, 30 of said rolls. The screw threads of the shafts 29, 30 run in opposite directions, and in the present instance the screw threads on the lower shaft 30 are shown as right handed and those on the upper shaft 29 are left handed, so that as the rolls 20, 21 revolve, the individual sections of each roll in contact with the fibrous layers 26, 23 have a tendency to run toward the right hand end of the shaft, and thereby be kept in contact with the adjacent sections to form a single or continuous roll. The endmost section at the right hand end of each combining roll may and preferably will be stationary on its shaft to form a stationary device for the other sections to limit the turning movement of said latter sections. By making the combining rolls of sections as described, certain left hand end sections can be rendered inactive, so as to adjust the length of the roll formed by the active sections to the width of the fibrous layers 26, 23, which enables protective fibrous layers of different widths to be applied to coated metal sheets of different widths, or in other words enables protected metal sheets of different widths to be produced with a single apparatus.

In Fig. 2 two sections of the rolls at the left hand end are shown in what may be termed their inactive position, being separated from the remaining sections by a substantial space 32. The two left hand end sections may be so positioned by turning them back on their threaded shafts, and when so placed, they are not intended to engage the upper and lower layers 26, 23 of fibrous material. If still narrower layers 26, 23 were to be used with a narrower metal sheet 18, one or more additional sections would be turned back to render them inactive.

The fibrous protective layers 26, 23 may and preferably will be applied to the coated metal sheet 18 so that one side portion of the upper layer 26 extends beyond the right hand side of the metal sheet, and one side portion of the lower layer 23 extends beyond the left hand side of the metal sheet, and these projecting portions of the fibrous layers may be folded in opposite or in the same direction about the side edges of the metal sheet. The projecting side portions of the fibrous layers may be folded about the side edges of the metal sheet to cover and seal the same, by folding mechanism, which is and may be essentially the same as that shown and described in the patent above referred to, and consisting of a series of grooved rolls 35 for bending or folding the projecting portion of the lower fibrous layer 23 upwardly and over upon the upper layer 26 at the left hand side edge of the metal sheet, and also consisting of a series of grooved rolls 36 for bending and folding the projecting portion of the upper layer 26 downwardly and under the lower layer 23 at the right hand end of the metal sheet, as shown in Fig. 11.

The grooved rolls 35, 36 have cooperating with them smooth rolls 37, 38 which serve as presser rolls.

In the present instance, additional intermediate smooth or plain rolls 39 are provided for supporting the metal sheet. Provision is made for adjusting the folding and supporting rolls so as to adapt them to the different widths of metal sheets being covered by the protective fibrous layers.

To this end the folding and presser rolls 35, 37 for the projecting portion of the lower layer 23 are mounted upon a frame comprising parallel horizontal rods 40 and parallel vertical rods 41, see Fig. 1, suitably connected together as described in the patent referred to, and the vertical rods 41 are supported at their lower ends by a base or connecting bar 42, which has a threaded engagement with a screw rod 43 extended across the apparatus and provided as herein shown with a hand wheel 44. By turning the hand wheel 44 in the proper direction, the frame carrying the folding rolls 35 and presser rolls 37 is moved toward the folding rolls 36 at the right hand side of the apparatus, so as to adjust the folding mechanism to metal sheets and fibrous layers of different widths. The frame for the right hand folding rolls 36 is of similar construction and may be rendered stationary by clamping or otherwise securing its base bar 42 to cross bars 45, which form a table for supporting the frames for the folding and presser rolls. The intermediate supporting rolls 39 are carried by frames 46 which are supported by the table 45 and are clamped or otherwise secured thereto in their adjusted positions, which are such as to have them engage the fibrous layers of the protected metal sheet between the folded side portions of said layers. The sealing or folding devices have cooperating with them draw rolls 50, 51, which are arranged in the planes of the combining rolls 20, 21 and in proximity to the folding devices, so as to engage the covered metal sheet before the latter leaves the combining rolls and thereby draw the covered metal sheet through the folding devices after the covered metal sheet has passed through the combining rolls. The upper draw roll 50 is of similar construction to the combining rolls, being composed of sections which are keyed on its shaft 52 to rotate therewith and slide thereon, so that some of said sections may be separated from the remaining sections to adjust the latter sections to the different widths of metal sheet and fibrous layers, and said sections may be secured in their adjusted positions in any suitable manner, as by set screws not shown. The lower draw roll 51 may be made in one piece, as it can be adjusted far enough to the left to not engage the folded under portion of the upper fibrous layer 26 at the right hand side of the metal sheet. The sections of the draw roll 50 are adjusted so that the active sections will form a roll of less length than the width of the metal sheet and will engage the fibrous layer within the folded over side portions of the latter, so that the pull upon the covered sheet is not exerted upon the folded over edge portions of the fibrous layers, whereby liability of injuring the folded over portions is avoided. The metal sheets are fed through the coating rolls 10, 12 so as to be separated from one another and when fed between the fibrous layers 26, 23 and through the folding devices 35, 36, the covered metal sheets are separated by short lengths of the upper and lower fibrous layers 26, 23 which are connected together by the surplus adhesive material from the metal sheets and form hinges, which enable the covered metal sheets to be stacked one upon the other upon a truck 60, see Fig. 5, by carrying the covered sheets over an elevated drum 61 with which cooperates a small draw or feed roll 62, which latter may and preferably will be sectional the same as the draw roll 50. In Fig. 5, a diagrammatic view of the apparatus is shown with additional rolls 63 preceding the feed rolls 19, and forming supporting rolls for the metal sheets. The space between successive metal sheets 18 affords opportunity for the upper coating roll 10 to be forced by its spring 160 into contact with the lower coating roll 12 so as to receive liquid asphalt therefrom.

The lower coating roll 12, the lower combining roll 21 and the lower draw roll 51 may be driven in unison from a counter shaft 64 through independent sets of gears, each set comprising, as shown in Fig. 1, a bevel gear 65 on the counter shaft, a bevel gear 66 on the roll to be driven, and intermediate bevel gears 67, 68 on an intermediate shaft, not shown. The upper coating roll 10 may be driven from the lower coating roll 12 by gears 70, see Fig. 2.

The upper combining roll 20 may be driven from the lower combining roll 21 by gears 71, and the upper draw roll 50 may be driven from the lower draw roll 51 by gears 72.

The counter shaft 64 may be driven from an electric motor 73 by a pinion 74 and gear 75 or it may be otherwise driven. Inasmuch as the rollers for folding the flaps or portions of the fibrous layers 23, 26, are the same as shown and desired in the patent referred to, and are not herein claimed broadly, it has been deemed sufficient to illustrate in Fig. 3 only one of the series of grooved rollers and to illustrate the position of the others of the series by their shafts, which are arranged to obtain a progressive bending or folding of the said flap.

Provision is made for supplying liquid asphalt to the flaps or portions of the fibrous layers which project beyond the side edges of the metal sheet. For this purpose the upper combining roll 20 has cooperating with its left hand end, a scraping device 80, see Figs. 4 and 6 to 10 inclusive, which cooperates with the end of the roll to remove surplus asphalt therefrom and which also cooperates with the projecting flap of the lower fibrous layer 23 which passes under the said scraper and is held up in engagement therewith by a supporting finger 81 carried by an arm 82 which is pivotally mounted on a bracket or cross bar 83, which is mounted on cross rods 84 so as to be adjustable thereon lengthwise thereof.

The supporting finger 81 is acted upon by a spring 85, see Fig. 4, to keep the projecting flap of the fibrous layer 23 in gentle engagement with the under surface of the scraper 80 while the machine is in operation, and thus ensure even distribution of the surplus asphalt upon the said flap.

The scraper 80 and its bracket 83 may be adjusted toward the right hand side of the machine in the following manner: The arm 82 is turned downward until it passes the vertical plane through its pivot, in which position the spring 80 acts to hold the arm 82 away from the lower combining roll 21. The upper combining roll 20 is then raised by turning the hand wheels 170 until the said roll clears the bracket 83, whereupon both the inactive sections of the roll 20 and the bracket 83 can be moved into the positions desired. When the bracket 83 has been moved into operative relation to the active sections of the roll 20, the arm 82 is then turned back into its normal position to support the flap, and the roll 20 is then lowered into its operative position in contact with roll 21.

The right hand end of the lower combining roll 12 has cooperating with it a similar scraper 180 and finger 181 carried by a bracket 183, which latter is arranged reversely to the bracket 83 and is mounted to slide on rods 184 located below the rods 84. The scraper 180 and finger 181 cooperate with the lower combining roll 21 as represented in Fig. 10, the scraper 180 being below the flap of the layer 26 and the finger 181 above the same, the latter acting to keep the said flap in operative relation to the scraper 180. If it is desired to produce a protected metal sheet in which both the right and left hand flaps are a part of the layer 23 and are folded upwardly over the layer 26, the bracket 183 is slid on the rods 184 away from the lower roll 21 toward the right, and a third bracket 283 provided with a scraper 280 and finger 281 and mounted on the rods 84 at the right hand end of the roll 20, is slid on the rods 84 toward the upper roll and into operative relation to the flap and the right hand end of the roll 20. In addition, the bracket 42 carrying the folding roll 36 is removed from the table 45 and a bracket 42 with folding rolls properly arranged to fold the right hand flap upwardly and over upon the metal sheet the same as the left hand folding roll, is clamped on the table 45 in place of the bracket 42 removed.

From the above description, it will be observed that the metal sheet is maintained in substantially the same plane, preferably horizontal as shown, and in a flat condition while it is being coated with the adhesive material, covered with the fibrous layers, sealed at its side edges by the folded over portions of the latter, and delivered from the folding devices, and that the mechanisms employed to effect these results coordinate so as to produce the protected metal sheet in a minimum time and at a minimum expense, and further so that protected metal sheets of various widths may be produced with the same apparatus. One embodiment of the invention is herein shown but it is not desired to limit the invention to the particular construction shown.

Claims:

1. In a machine of the character described, in combination, rolls for applying adhesive material to the opposite surfaces of a metal sheet, combining rolls composed of sections movable axially of said rolls and arranged in the planes of said coating rolls to receive the coated metal sheet therefrom and to apply layers of fibrous material to the opposite surfaces of said coated metal sheet so that opposite sides of the fibrous layers project beyond opposite side edges of the coated metal sheet, and folding means arranged in the planes of said combining and coating rolls for folding the projecting portions of said fibrous layers around said side edges and upon the fibrous layers affixed to the opposite surfaces of said metal sheet.

2. In a machine of the character described, in combination, rolls for applying adhesive material to the opposite surfaces of a metal sheet, combining rolls arranged in the planes of said coating rolls to receive the coated metal sheet therefrom and to apply layers of fibrous material to the opposite surfaces of said coated metal sheet, said combining rolls being provided with sections capable of being rendered inactive while other sections remain active, and folding devices arranged in the planes of said combining and coating rolls to fold projecting side portions of the fibrous layers over the side edges of the metal sheet, the folding devices cooperating with one side edge of the metal sheet being adjustable toward the folding devices which cooperate with the opposite side edge of the metal sheet.

3. In a machine of the character described, in combination, rolls for applying adhesive material to the opposite surfaces of a metal sheet, combining rolls arranged in the planes of said coating rolls to receive the coated metal sheet therefrom and to apply layers of fibrous material to the opposite surfaces of said coated metal sheet, said combining rolls being provided with sections capable of being rendered inactive while other sections remain active, folding devices arranged in the planes of said combining and coating rolls to fold projecting side portions of the fibrous layers over the side edges of the metal sheet, the folding devices cooperating with one side edge of the metal sheet being adjustable toward the folding devices which cooperate with the opposite side edge of the metal sheet, and draw rolls arranged in the planes of the combining rolls and one of which is provided with sections capable of being rendered inactive while other sections remain active.

4. In a machine of the character described, in combination, means for coating a metal sheet with adhesive material, and combining rolls for applying separate layers of fibrous material to the opposite surfaces of said coated sheet, said combining rolls being provided with sections movable lengthwise of the rolls to render them inactive while other sections remain active.

5. In a machine of the character described, in combination, means for coating a metal sheet with adhesive material, and a combining roll for applying a layer of fibrous material to one surface of the coated metal sheet, said roll having a section movable laterally with relation to the path of movement of the coated metal sheet to render it inactive and enable the remaining portion of said roll to be active for applying a fibrous layer of a different width to a metal sheet of a different width.

6. In a machine of the character described, in combination, means for coating a metal sheet with adhesive material, combining rolls for applying fibrous layers to the opposite surfaces of said metal sheet and provided with sections capable of being rendered inactive upon said fibrous layers, folding devices cooperating with the opposite side edges of said metal sheet and one of which is movable toward the other, and draw rolls cooperating with said folding devices to draw the covered metal sheet therethrough, one of said draw rolls having sections capable of being rendered inactive to engage the fibrous layers on said metal sheet.

7. In a machine of the character described, in combination, coating rolls for applying adhesive material to the opposite surfaces of a metal sheet, sectional combining rolls cooperating with said coating rolls to apply layers of fibrous material to the opposite surfaces of said coated metal sheet and have portions of the fibrous material project beyond the side edges of the metal sheet, folding devices cooperating with the opposite side edges of the metal sheet to fold the projecting portions of the fibrous material over said side edges, the folding devices cooperating with one side edge being movable toward the folding device cooperating with the other side edge, and draw rolls cooperating with said folding devices to receive the covered metal sheet therefrom.

8. In a machine of the character described, in combination, means for coating a metal sheet with adhesive material, means for applying fibrous layers to the opposite surfaces of the coated metal sheet and adjustable with relation to the path of movement of the coated metal sheet to enable fibrous layers of different widths to be applied to coated metal sheets of different widths.

9. In a machine of the character described, in combination, means for coating a metal sheet with adhesive material, combining rolls for applying separate layers of fibrous material to the opposite surfaces of said coated sheet, said combining rolls being provided with sections adjustable with relation to each other, and scraping devices cooperating with the ends of said combining rolls, and one of which scraping devices is adjustable in the direction of the length of the roll with which it cooperates.

In testimony whereof I have signed my name to this specification.

WILLIAM W. RONEY.